(12) United States Patent
Wang et al.

(10) Patent No.: US 12,067,558 B2
(45) Date of Patent: Aug. 20, 2024

(54) METHOD OF DISTRIBUTING TOKENS AND MANAGING TOKEN RELATIONSHIPS

(71) Applicant: Visa International Service Association, San Francisco, CA (US)

(72) Inventors: Jing Wang, San Francisco, CA (US); Chackan Lai, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 239 days.

(21) Appl. No.: 17/209,672

(22) Filed: Mar. 23, 2021

(65) Prior Publication Data

US 2021/0233069 A1    Jul. 29, 2021

Related U.S. Application Data

(63) Continuation of application No. 16/302,054, filed as application No. PCT/US2016/042991 on Jul. 19, 2016, now Pat. No. 10,990,967.

(51) Int. Cl.
  *G06Q 20/38*   (2012.01)
  *G06Q 20/02*   (2012.01)
  (Continued)

(52) U.S. Cl.
  CPC ......... *G06Q 20/3821* (2013.01); *G06Q 20/02* (2013.01); *G06Q 20/325* (2013.01);
  (Continued)

(58) Field of Classification Search
  None
  See application file for complete search history.

(56) References Cited

U.S. PATENT DOCUMENTS 5,280,527 A   1/1994 Gullman et al.
5,613,012 A   3/1997 Hoffman et al.
(Continued)

FOREIGN PATENT DOCUMENTS

EP   1028401   8/2000
EP   2156397   2/2010
(Continued)

OTHER PUBLICATIONS

Banerjee, Sanjay, and Sunil Karforma. "A prototype design for DRM based credit card transaction in E-commerce." ubiquity 2008. May 2008: 2-1. (Year: 2008).*
(Continued)

*Primary Examiner* — David P Sharvin
*Assistant Examiner* — Brock E Turk
(74) *Attorney, Agent, or Firm* — Kilpatrick Townsend & Stockton LLP

(57) ABSTRACT

A method for facilitating a transaction may include generating, via a token server computer, a token for use by a first entity computer, wherein the token is generated in response to a request received from the first entity computer. The method may also include transmitting, via the token server computer, the token to the first entity computer, wherein the first entity computer transmits the token to a second entity computer. The method may also include receiving, at the token server computer and from the first entity computer, data indicative of the second entity computer successfully receiving the token. The data may include a hashed value derived from at least the token, data indicative of an identity of the second entity computer, and writing, by the token server computer, the data indicative of the second entity computer successfully receiving the token to a registry.

11 Claims, 8 Drawing Sheets

(51) Int. Cl.
  *G06Q 20/32* (2012.01)
  *G06Q 20/40* (2012.01)
  *G06Q 40/02* (2023.01)
  *H04L 9/06* (2006.01)

(52) U.S. Cl.
  CPC ....... *G06Q 20/3827* (2013.01); *G06Q 20/385* (2013.01); *G06Q 20/4018* (2013.01); *G06Q 40/02* (2013.01); *H04L 9/0643* (2013.01)

(56) References Cited

U.S. PATENT DOCUMENTS

| | | | |
|---|---|---|---|
| 5,781,438 | A | 7/1998 | Lee et al. |
| 5,883,810 | A | 3/1999 | Franklin et al. |
| 5,930,767 | A | 7/1999 | Reber et al. |
| 5,953,710 | A | 9/1999 | Fleming |
| 5,956,699 | A | 9/1999 | Wong et al. |
| 6,000,832 | A | 12/1999 | Franklin et al. |
| 6,014,635 | A | 1/2000 | Harris et al. |
| 6,044,360 | A | 3/2000 | Picciallo |
| 6,163,771 | A | 12/2000 | Walker et al. |
| 6,227,447 | B1 | 5/2001 | Campisano |
| 6,236,981 | B1 | 5/2001 | Hill |
| 6,267,292 | B1 | 7/2001 | Walker et al. |
| 6,327,578 | B1 | 12/2001 | Linehan |
| 6,341,724 | B2 | 1/2002 | Campisano |
| 6,385,596 | B1 | 5/2002 | Wiser et al. |
| 6,422,462 | B1 | 7/2002 | Cohen |
| 6,425,523 | B1 | 7/2002 | Shem-Ur et al. |
| 6,453,301 | B1 | 9/2002 | Niwa |
| 6,592,044 | B1 | 7/2003 | Wong et al. |
| 6,636,833 | B1 | 10/2003 | Flitcroft et al. |
| 6,748,367 | B1 | 6/2004 | Lee |
| 6,805,287 | B2 | 10/2004 | Bishop et al. |
| 6,879,965 | B2 | 4/2005 | Fung et al. |
| 6,891,953 | B1 | 5/2005 | DeMello et al. |
| 6,901,387 | B2 | 5/2005 | Wells et al. |
| 6,931,382 | B2 | 8/2005 | Laage et al. |
| 6,938,019 | B1 | 8/2005 | Uzo |
| 6,941,285 | B2 | 9/2005 | Sarcanin |
| 6,980,670 | B1 | 12/2005 | Hoffman et al. |
| 6,990,470 | B2 | 1/2006 | Hogan et al. |
| 6,991,157 | B2 | 1/2006 | Bishop et al. |
| 7,051,929 | B2 | 5/2006 | Li |
| 7,069,249 | B2 | 6/2006 | Stolfo et al. |
| 7,103,576 | B2 | 9/2006 | Mann, III et al. |
| 7,113,930 | B2 | 9/2006 | Eccles et al. |
| 7,136,835 | B1 | 11/2006 | Flitcroft et al. |
| 7,177,835 | B1 | 2/2007 | Walker et al. |
| 7,177,848 | B2 | 2/2007 | Hogan et al. |
| 7,194,437 | B1 | 3/2007 | Britto et al. |
| 7,209,561 | B1 | 4/2007 | Shankar et al. |
| 7,264,154 | B2 | 9/2007 | Harris |
| 7,287,692 | B1 | 10/2007 | Patel et al. |
| 7,292,999 | B2 | 11/2007 | Hobson et al. |
| 7,350,230 | B2 | 3/2008 | Forrest |
| 7,353,382 | B2 | 4/2008 | Labrou et al. |
| 7,379,919 | B2 | 5/2008 | Hogan et al. |
| RE40,444 | E | 7/2008 | Linehan |
| 7,415,443 | B2 | 8/2008 | Hobson et al. |
| 7,444,676 | B1 | 10/2008 | Asghari-Kamrani et al. |
| 7,469,151 | B2 | 12/2008 | Khan et al. |
| 7,548,889 | B2 | 6/2009 | Bhambri et al. |
| 7,567,934 | B2 | 7/2009 | Flitcroft et al. |
| 7,567,936 | B1 | 7/2009 | Peckover et al. |
| 7,571,139 | B1 | 8/2009 | Giordano et al. |
| 7,571,142 | B1 | 8/2009 | Flitcroft et al. |
| 7,580,898 | B2 | 8/2009 | Brown et al. |
| 7,584,153 | B2 | 9/2009 | Brown et al. |
| 7,593,896 | B1 | 9/2009 | Flitcroft et al. |
| 7,606,560 | B2 | 10/2009 | Labrou et al. |
| 7,627,531 | B2 | 12/2009 | Breck et al. |
| 7,627,895 | B2 | 12/2009 | Gifford et al. |
| 7,650,314 | B1 | 1/2010 | Saunders |
| 7,685,037 | B2 | 3/2010 | Reiners et al. |
| 7,702,578 | B2 | 4/2010 | Fung et al. |
| 7,707,120 | B2 | 4/2010 | Dominguez et al. |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II et al. |
| 7,784,685 | B1 | 8/2010 | Hopkins, III |
| 7,793,851 | B2 | 9/2010 | Mullen |
| 7,801,826 | B2 | 9/2010 | Labrou et al. |
| 7,805,376 | B2 | 9/2010 | Smith |
| 7,805,378 | B2 | 9/2010 | Berardi et al. |
| 7,818,264 | B2 | 10/2010 | Hammad |
| 7,828,220 | B2 | 11/2010 | Mullen |
| 7,835,960 | B2 | 11/2010 | Breck et al. |
| 7,841,523 | B2 | 11/2010 | Oder, II et al. |
| 7,841,539 | B2 | 11/2010 | Hewton |
| 7,844,550 | B2 | 11/2010 | Walker et al. |
| 7,848,980 | B2 | 12/2010 | Carlson |
| 7,849,020 | B2 | 12/2010 | Johnson |
| 7,853,529 | B1 | 12/2010 | Walker et al. |
| 7,853,995 | B2 | 12/2010 | Chow et al. |
| 7,865,414 | B2 | 1/2011 | Fung et al. |
| 7,873,579 | B2 | 1/2011 | Hobson et al. |
| 7,873,580 | B2 | 1/2011 | Hobson et al. |
| 7,890,393 | B2 | 2/2011 | Talbert et al. |
| 7,891,563 | B2 | 2/2011 | Oder, II et al. |
| 7,896,238 | B2 | 3/2011 | Fein et al. |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein et al. |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders et al. |
| 8,046,256 | B2 | 10/2011 | Chien et al. |
| 8,060,448 | B2 | 11/2011 | Jones |
| 8,060,449 | B1 | 11/2011 | Zhu |
| 8,074,877 | B2 | 12/2011 | Mullen et al. |
| 8,074,879 | B2 | 12/2011 | Harris |
| 8,082,210 | B2 | 12/2011 | Hansen et al. |
| 8,095,113 | B2 | 1/2012 | Kean et al. |
| 8,104,679 | B2 | 1/2012 | Brown |
| RE43,157 | E | 2/2012 | Bishop et al. |
| 8,109,436 | B1 | 2/2012 | Hopkins, III |
| 8,121,942 | B2 | 2/2012 | Carlson et al. |
| 8,121,956 | B2 | 2/2012 | Carlson et al. |
| 8,126,449 | B2 | 2/2012 | Beenau et al. |
| 8,132,723 | B2 | 3/2012 | Hogg et al. |
| 8,171,525 | B1 | 5/2012 | Pelly et al. |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza et al. |
| 8,219,489 | B2 | 7/2012 | Patterson |
| 8,224,702 | B2 | 7/2012 | Mengerink et al. |
| 8,225,385 | B2 | 7/2012 | Chow et al. |
| 8,229,852 | B2 | 7/2012 | Carlson |
| 8,265,993 | B2 | 9/2012 | Chien et al. |
| 8,280,777 | B2 | 10/2012 | Mengerink et al. |
| 8,281,991 | B2 | 10/2012 | Wentker et al. |
| 8,328,095 | B2 | 12/2012 | Oder, II et al. |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders et al. |
| 8,401,539 | B2 | 3/2013 | Beenau et al. |
| 8,401,898 | B2 | 3/2013 | Chien et al. |
| 8,402,555 | B2 | 3/2013 | Grecia |
| 8,403,211 | B2 | 3/2013 | Brooks et al. |
| 8,412,623 | B2 | 4/2013 | Moon et al. |
| 8,412,837 | B1 | 4/2013 | Emigh et al. |
| 8,417,642 | B2 | 4/2013 | Oren |
| 8,433,116 | B2 | 4/2013 | Butler et al. |
| 8,447,699 | B2 | 5/2013 | Batada et al. |
| 8,453,223 | B2 | 5/2013 | Svigals et al. |
| 8,453,925 | B2 | 6/2013 | Fisher et al. |

(56) References Cited

U.S. PATENT DOCUMENTS

| | | |
|---|---|---|
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,077,709 B1* | 7/2015 | Dall ............ H04L 63/126 |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,626,674 B1* | 4/2017 | Wolff ............ G06Q 20/3827 |
| 9,680,942 B2 | 6/2017 | Dimmick |
| 10,990,967 B2 | 4/2021 | Wang et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0147563 A1 | 6/2008 | Yen et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |

(56) References Cited

U.S. PATENT DOCUMENTS

| | | |
|---|---|---|
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1* | 8/2012 | Schlesser ............ G06Q 20/3829 705/71 |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |

(56) References Cited

U.S. PATENT DOCUMENTS

| | | |
|---|---|---|
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0136807 A1* | 5/2014 | Brown .................. G06F 3/06 711/E12.092 |
| 2014/0143137 A1 | 5/2014 | Carlson |
| 2014/0149293 A1* | 5/2014 | Laracey ............... G06Q 20/108 705/44 |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0095133 A1 | 4/2015 | Parker et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0262195 A1* | 9/2015 | Bergdale ............ G06Q 20/3274 705/5 |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1* | 11/2015 | Kumnick ............ G06Q 20/4016 726/9 |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239835 A1* | 8/2016 | Marsyla ............ G06Q 20/3829 |
| 2016/0239842 A1 | 8/2016 | Cash et al. |
| 2016/0269391 A1 | 9/2016 | Gaddam et al. |
| 2016/0286391 A1* | 9/2016 | Khan ................... G06Q 20/327 |
| 2016/0301683 A1 | 10/2016 | Laxminarayanan et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0201520 A1 | 7/2017 | Chandoor et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |
| 2018/0075081 A1 | 3/2018 | Chipman |
| 2018/0247303 A1 | 8/2018 | Raj et al. |
| 2018/0268405 A1 | 9/2018 | Lopez |

FOREIGN PATENT DOCUMENTS

| | | |
|---|---|---|
| GB | 2525423 A | 10/2015 |
| KR | 20150132098 | 11/2015 |
| WO | 0014648 | 3/2000 |
| WO | 0135304 | 5/2001 |
| WO | 0135304 | 5/2002 |
| WO | 2004042536 | 5/2004 |
| WO | 2004051585 | 6/2004 |
| WO | 2005001751 | 1/2005 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013115990 | 8/2013 |
| WO | 2013119914 | 8/2013 |

(56) References Cited

FOREIGN PATENT DOCUMENTS

| WO | 2013179271 | 12/2013 |
|---|---|---|
| WO | 2018017068 | 1/2018 |

OTHER PUBLICATIONS

Koschuch, Manuel, et al. "Token-based authentication for smartphones." 2013 International Conference on Data Communication Networking (DCNET). IEEE, 2013. (Year: 2013).*
IN201947004244, "First Examination Report", Nov. 11, 2021, 5 pages.
"Petition for Inter Partes Review of U.S. Pat. No. 8,533,860 Challenging Claims 1-30 Under 35 U.S.C. § 312 and C.F.R. § 42.104", USPTO Patent Trial and Appeal Board, IPR 2016-00600, Feb. 17, 2016, 65 pages.
U.S. Appl. No. 15/585,077, "U.S. Patent Application No.", System and Method Using Interaction Token, filed May 2, 2017, 36 pages.
U.S. Appl. No. 15/977,921, "U.S. Patent Application No.", Integration of Verification Tokens With Mobile Communication Devices, filed May 11, 2018, 112 pages.
U.S. Appl. No. 16/020,796, "U.S. Patent Application No.", Embedding Cloud-Based Functionalities in a Communication Device, filed Jun. 27, 2018, 153 pages.
U.S. Appl. No. 16/302,054, "Advisory Action", Sep. 18, 2020, 5 pages.
U.S. Appl. No. 16/302,054, "Final Office Action", Jul. 6, 2020, 19 pages.
U.S. Appl. No. 16/302,054, "Non-Final Office Action", Jan. 7, 2020, 20 pages.
U.S. Appl. No. 16/302,054, "Notice of Allowance", Dec. 23, 2020, 19 pages.
U.S. Appl. No. 61/738,832, "U.S. Provisional Application No.", Management of Sensitive Data, filed Dec. 18, 2012, 22 pages.
U.S. Appl. No. 61/751,763, "U.S. Provisional Application No.", Payments Bridge, filed Jan. 11, 2013, 64 pages.
U.S. Appl. No. 61/892,407, "U.S. Provisional Application No.", Issuer Over-The-Air Update Method and System, filed Oct. 17, 2013, 28 pages.
U.S. Appl. No. 61/894,749, "U.S. Provisional Application No.", filed Methods and Systems for Authentication and Issuance of Tokens in a Secure Environment, Oct. 23, 2013, 67 pages.
U.S. Appl. No. 61/926,236, "U.S. Provisional Application No.", Methods and Systems for Provisioning Mobile Devices With Payment Credentials and Payment Token Identifiers, filed Jan. 10, 2014, 51 pages.
U.S. Appl. No. 62/000,288, "U.S. Provisional Application No.", Payment System Canonical Address Format, filed May 19, 2014, 58 pages.
U.S. Appl. No. 62/003,717, "U.S. Provisional Application No.", Mobile Merchant Application, filed May 28, 2014, 58 pages.
U.S. Appl. No. 62/024,426, "U.S. Provisional Application No.", Secure Transactions Using Mobile Devices, filed Jul. 14, 2014, 102 pages.
U.S. Appl. No. 62/037,033, "U.S. Provisional Application No.", Sharing Payment Token, filed Aug. 13, 2014, 36 pages.
U.S. Appl. No. 62/038,174, "U.S. Provisional Application No.", Customized Payment Gateway, filed Aug. 15, 2014, 42 pages.
U.S. Appl. No. 62/042,050, "U.S. Provisional Application No.", Payment Device Authentication and Authorization System, filed Aug. 26, 2014, 120 pages.
U.S. Appl. No. 62/053,736, "U.S. Provisional Application No.", Completing Transactions Without a User Payment Device, filed Sep. 22, 2014, 31 pages.
U.S. Appl. No. 62/054,346, "U.S. Provisional Application No.", Mirrored Token Vault, filed Sep. 23, 2014, 38 pages.
U.S. Appl. No. 62/103,522, "U.S. Provisional Application No.", Methods and Systems for Wallet Provider Provisioning, filed Jan. 14, 2015, 39 pages.
U.S. Appl. No. 62/108,403, "U.S. Provisional Application No.", Wearables With NFC HCE, filed Jan. 27, 2015, 32 pages.
U.S. Appl. No. 62/117,291, "U.S. Provisional Application No.", Token and Cryptogram Using Transaction Specific Information, filed Feb. 17, 2015, 25 pages.
U.S. Appl. No. 62/128,709, "U.S. Provisional Application No.", Tokenizing Transaction Amounts, filed Mar. 5, 2015, 30 pages.
EP16909662.5, "Extended European Search Report", Jul. 9, 2019, 8 pages.
Paquin et al., "U-Prove Cryptographic Specification V1.1 Revision 3", Microsoft Corporation, Dec. 2013, 23 pages.
PCT/US2016/042991, "International Preliminary Report on Patentability", Jan. 31, 2019, 8 pages.
PCT/US2016/042991, "International Search Report and Written Opinion", Apr. 17, 2017, 11 pages.
CN201680087837.1, "Office Action", Nov. 16, 2022, 16 pages.
Notice of Decision to Grant, mailed May 15, 2023, Chinese Patent Application No. CN201680087837.1, 4 pages.

* cited by examiner

METHOD OF DISTRIBUTING TOKENS AND MANAGING TOKEN RELATIONSHIPS

This application is a Continuation of U.S. Application Ser. No. 16/302,054, filed Nov. 15, 2018, which is a National Stage of International Application No. PCT/US2016/042991, filed Jul. 19, 2016, which are herein incorporated by in their entirety.

BACKGROUND

Tokenization has become a popular method for increasing the security of transactions. The use of tokenization provides many advantages when conducting these types of transactions, such as improving efficiency and security. For example, a token may be generated to represent a primary account number (PAN) or other type of sensitive data (such as a ticket to an event). Often times, tokens are passed from one entity to another. For example, a token may be passed by one merchant to another merchant in certain integrated systems. However, in modern-day complex ecosystems, it becomes increasingly complex to track the passing of tokens through several entities. It may be important to track the chain of custody of a token to ensure that the token has not been tampered with.

A conventional token transaction system can be illustrated with reference to FIG. 1. In the conventional token transaction system, a token requestor 110 is in communication with a token server computer 120. The token requestor may be an entity computer or device that requests a token from the token server computer 120. The token server computer 120 is responsible for generation and registration of a token. For example, the token requestor 110 requests a token from the token server computer 120 end upon verification, the token server computer 120 generates, registers, and returns the token to the token requestor 110. The token requestor 110 then initiates a payment transaction either directly with (or through a merchant) the payment processor network 130 by sending an authorization request message including the token to the payment processor network 130. The payment processor network 130 then forwards the authorization request message to the issuer 140 for authorization.

While the conventional token transaction system is useful, improvements can be made. For example, often times the token requestor 110 may forward a token received from the token server computer 120 to second entity (not shown), and in turn the second entity may forward the token to a third entity, etc. In such scenarios, it is difficult for the token server computer 120 to track the various handoffs of the token from one entity to another, and maintain a level of a confidence in the integrity and validity of the generated token.

Embodiments of the invention address these and other problems.

BRIEF SUMMARY

In some embodiments of the invention, systems and methods use hash functions to trace and track the distribution of token credentials as they pass from the token requestor, through the entities involved in transaction, to the token "consumer," e.g. a merchant sending the token credentials received for authorization. Embodiments of the invention support tokenized transactions in more complex scenarios, where tokens are passed between multiple entities. Embodiments of the invention also increase security and decrease the risk of fraud associated with the token.

Some embodiments of the invention are directed to a method for facilitating a transaction. The method may include generating, via a token server computer, a token for use by a first entity computer, wherein the token is generated in response to a request received from the first entity computer. The method may also include transmitting, via the token server computer, the token to the first entity computer, wherein the first entity computer transmits the token to a second entity computer. The method may also include receiving, at the token server computer and from the first entity computer, data indicative of the second entity computer successfully receiving the token. The data may include a hashed value derived from at least the token, data indicative of an identity of the second entity computer, and writing, by the token server computer, the data indicative of the second entity computer successfully receiving the token to a registry.

In some embodiments, prior to receiving, at the token server computer and from the first entity computer, the data indicative of the second entity computer successfully receiving the token, the first entity computer receives the data indicative of the second entity computer successfully receiving the token from the second entity computer.

In some embodiments, the hashed value is generated by the second entity computer.

In some embodiments, the hashed value is a first hashed value, and the method further includes receiving, at the token server computer and from the second entity computer, data indicative of a third entity computer successfully receiving the token. The data may include a second hashed value derived from at least the token and data indicative of an identity of the third entity computer. The data may also include writing, by the token server computer, the data indicative of the third entity computer successfully receiving the token to the registry.

In some embodiments, the second hashed value is generated by the third entity computer.

In some embodiments, the first entity computer is a first merchant computer and the second entity computer is a second merchant computer.

In some embodiments, the method also includes validating, by the token server computer, the token based at least in part on the data written to the registry.

In some embodiments, the token is associated with a primary account number (PAN).

In some embodiments, the token is associated with an entry ticket to an event.

In some embodiments, the token server computer resides within a cloud network.

Other embodiments of the invention are directed to servers and systems that are configured to perform the above-described methods.

These and other embodiments of the invention are described in further detail below.

DETAILED DESCRIPTION

Figure 1:
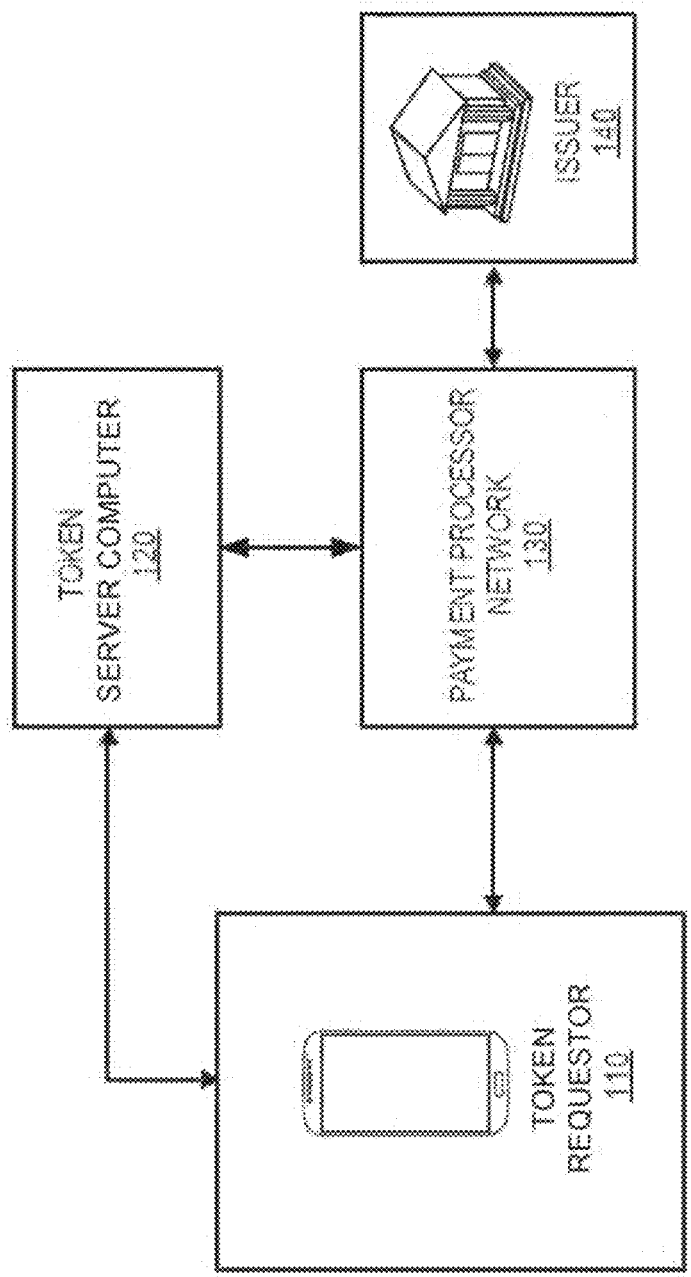
FIG. 1 shows a block diagram of a typical token transaction system.

Prior to discussing embodiments of the invention, descriptions of some terms may be helpful in understanding embodiments of the invention.

A "mobile device" may comprise any suitable electronic device that may be transported and operated by a user, which may also provide remote communication capabilities to a network. Examples of remote communication capabilities include using a mobile phone (wireless) network, wireless data network (e.g 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g when a device has remote access to a network by tethering to another device—i.e. using the other device as a modem—both devices taken together may be considered a single mobile device).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that services payment tokens. In some embodiments, a token service system can requesting, determine (e.g., generate) and/or issue tokens, and maintain an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.). POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcement of appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g, with an issuer-specific key). In some embodiments, a token request message may be formatted as an authorization request message (e.g., an ISO 8583 message format). The token request message may be distinguishable from an authorization request message based on a number of factors. For example, the token request message may have a zero dollar amount in an authorization amount field. As another example, the token request message may include a flag or other indicator specifying that the message is a token request message.

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, a token response message may be formatted as an authorization response message (e.g., an ISO 8583 message format). The token response message may be distinguishable from an authorization response message based on a number of factors. For example, the token response message may have a zero dollar amount in an authorization amount field. As another example, the token response message may include a flag or other indicator specifying that the message is a token response message.

A "user" may include an individual In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may bean issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only a service code, a CVV (card verification value), a dCVV (dynamic card verification value), a PAN (primary account number or "account number"), a payment token, a user name, an expiration date, etc. An authorization request message may also comprise "transaction information" such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchants access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 2:
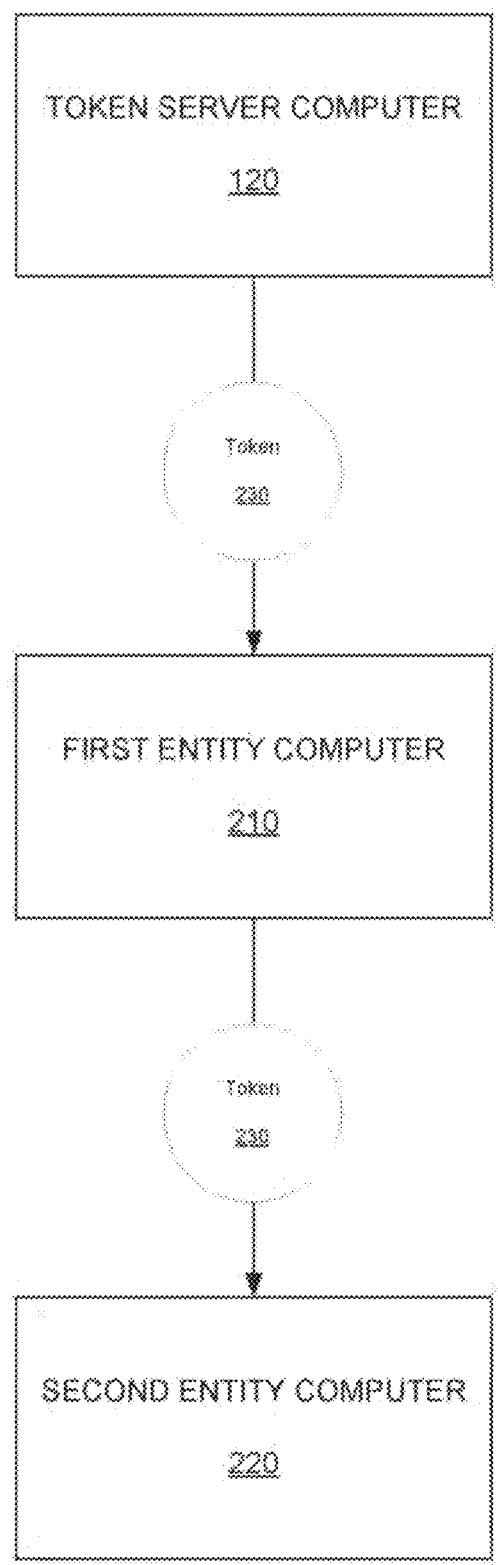
FIG. 2 illustrates the passing of a token between multiple entities, in accordance with some embodiments of the invention.

FIG. 2 illustrates the passing of a token between multiple entities, in accordance with some embodiments of the invention. A token server computer 120 may generate a token 230 in response to a token request from a token requestor. The token requestor could be a communication device such as a mobile device (e.g., a mobile wallet application running on a smartphone) or could also be a merchant computer. For example, an online merchant may request that a token be generated. In this example, the first entity computer 210 could be the token requestor. Upon the first entity computer 210 requesting a token from the token server computer 120, the token server computer 120 may generate the token 230 and transmit the token 230 to the first entity computer 210.

In some cases, the first entity computer 210 may then forward the generated token 230 to the second entity computer 220. The token 230 may even be distributed from the second entity computer 220 to a third entity computer, etc. Token distribution amongst various entities may often be seen where there are more than two parties to a transaction.

The distribution of tokens through various entities that may process transactions can become difficult for the token server computer 120. Many token providers discourage such types of transactions for these reasons. However, the embodiments described herein allow for the token server computer 120 (e.g., token provider) to track the various handoffs of the token from one entity to another; and maintain a level of a confidence in the integrity and validity of the generated token.

Figure 3:
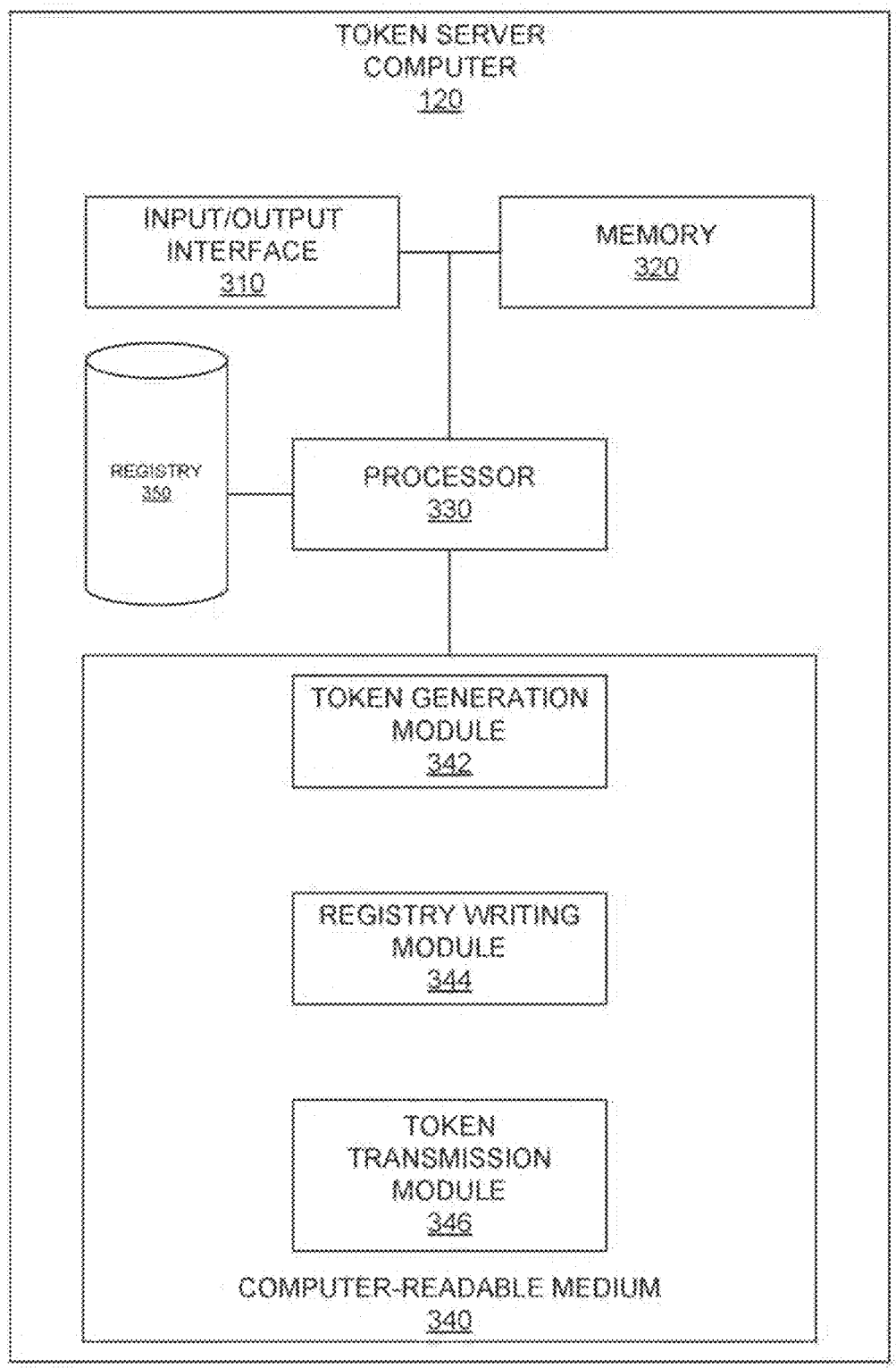
FIG. 3 shows a block diagram of a token server computer, in accordance with some embodiments of the invention.

FIG. 3 shows a block diagram of a token server computer 120, in accordance with some embodiments of the invention. Token server computer 120 includes an input/output interface 310, a memory 320, a processor 330, a computer-readable medium 340, and a registry 350. In some embodiments, token server computer 120 may reside within a token provider cloud. The token server computer 120 may be configured to generate a token.

The input/output (I/O) interface 310 is configured to receive and transmit data. For example, the I/O interface 310 may receive a request for a token and may transmit a generated token over a communication channel. The I/O interface 310 may also be used for direct interaction with the token server computer 120. The token server computer 120 may accept input from an input device such as, but not limited to, a keyboard, keypad, or mouse. Further, the I/O interface 310 3 may display output on a display device.

Memory 320 may be any magnetic, electronic, or optical memory it can be appreciated that memory 320 may include any number of memory modules. An example of memory 320 may be dynamic random access memory (DRAM).

Processor 330 may be any general-purpose processor operable to carry out instructions on the token server computer 120. The processor 330 is coupled to other units of the token server computer 120 including input/output interface 310, memory 320, and computer-readable medium 340.

Computer-readable medium 340 may be any magnetic, electronic, optical, or other computer-readable storage medium. Computer-readable storage medium 340 includes token generation module 342, registry writing module 344, and token transmission module 346.

The token generation module 342 may be configured to, when executed by processor 330, generate a token in response to receiving a token request. The token generated may be associated with a primary account number (PAN). The PAN may be associated with, for example, a bank account or credit card account. The generated token may be intended for use by the token requestor.

In some embodiments, the token generation module 342 may receive a token requestor identifier, an account number (e.g., PAN), an expiration date and a CVV2. In some embodiments, the token generation module 342 may also receive optional information such as a consumer name, a consumer address and zip code, a requested token type (e.g., payment static, payment dynamic, non-payment, etc.), a card verification status (e.g., AVS/CVV check status), a MSISDN, a UUID, an IMEI, an OS type/version and any other suitable information, in one embodiment, the token generation module 342 may generate a token response with a token number and a token expiration date. In one embodiment, the token generation module 342 may validate the token requestor identifier, determine the PAN type and generate a token from respective token BIN ranges. The token generation module 342 may also provide an interface to the token requestors to submit a bulk token request file.

In some embodiments, the token generation module 342 may access a token range table that represents available token ranges provisioned by a payment processing network computer and token ranges that have not been associated with PAN ranges. The token generation module 342 may access another table that includes minimum and maximum account ranges for the PAN and the associated token ranges. The token ranges may include the token ranges provisioned by a payment processing network computer 160 and token ranges provisioned by an issuer computer.

The registry writing module 344 may be configured to, when executed by processor 330, write a hashed value generated by an entity into the registry 350. An entity may generate a hashed value that is associated with the token generated by the token generation module 342. In some embodiments, the entity may generate the hash value upon receiving the token from the token server computer 120 or from another entity. In some embodiments, the generated hash value may be derived by performing a hash function on data identifying the receiving entity and the token data. In some embodiments, the hashed value may be a token digest or a token usage key In some embodiments, the hash function may be performed on previously hashed data. In some embodiments, the hash function may be performed in accordance with a keyed-hash message authentication code (HMAC). The generated hash value can create a "record" of the distribution of the token to various entities. An entity receiving the token may generate the hash value and return the generated hash value to the transmitting entity or the token server computer 120, as a record that the token was received by the intended receiving entity. The record can indicate the relationship between the token and the receiving entity. The record may be traceable all the way back to the original token server computer 120. For example, if a token generated by the token server computer 120 was transmitted to a first entity computer, which in turn transmitted the token to a second entity computer, the hash value may show the record of distribution of the token between the token server computer 120, the first entity computer, and the second entity computer.

The token transmission module 346 may be configured to, when executed by processor 330, transmit a token generated by the token generation module 342 to a token requestor. The token transmission module 346 may interface with the input/output interface 310 in order to transmit the generated token. The generated token may be transmitted to the token requestor via a communication channel such as, but not limited to, the Internet. In some embodiments, the token server computer 120 may receive a hash value in response to transmitting the generated token to an entity.

Figure 4:
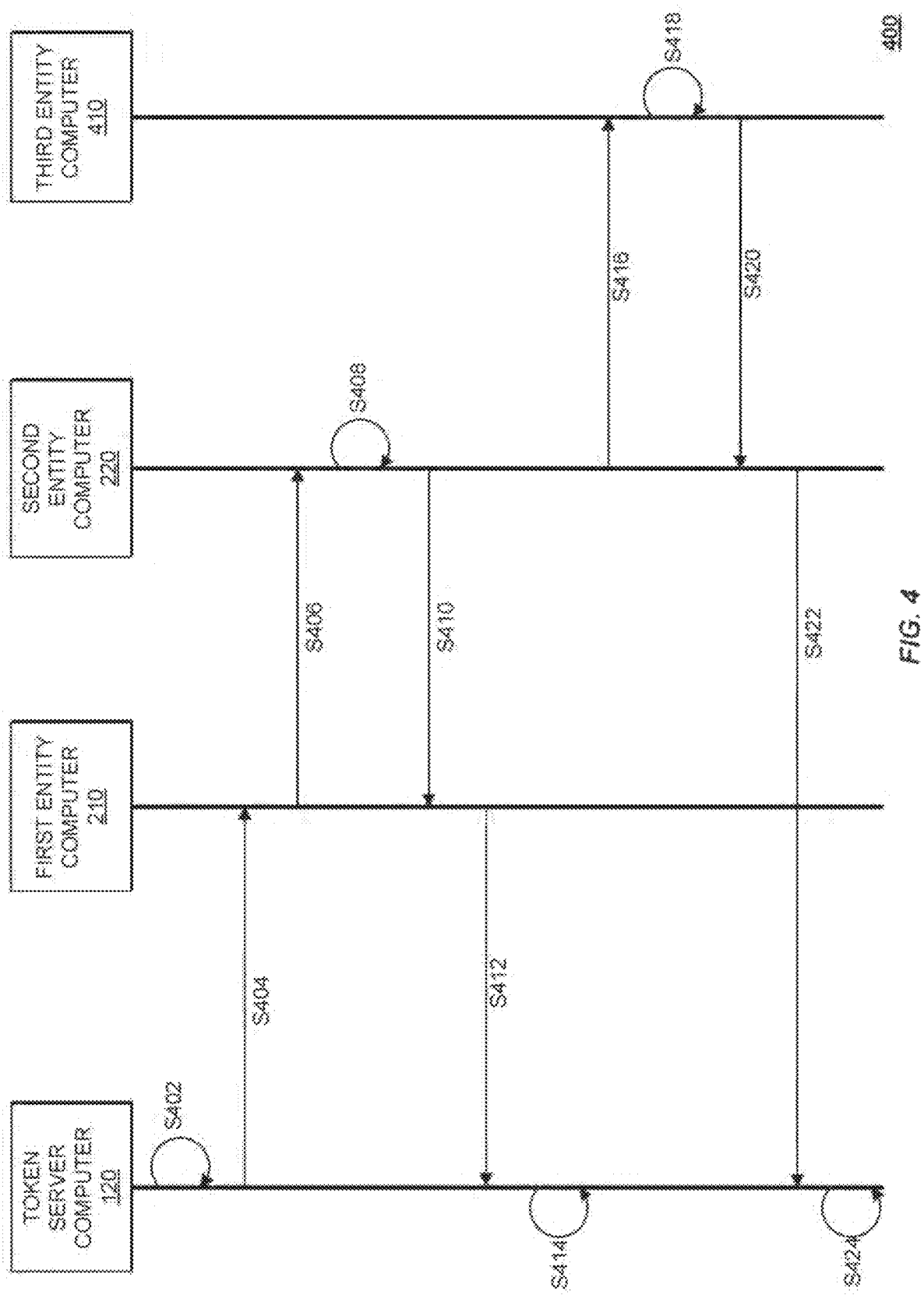
FIG. 4 illustrates a flow between a token server computer and multiple entities, in accordance with embodiments of the invention.

FIG. 4 illustrates a flow 400 between a token server computer 120 and multiple entities, in accordance with embodiments of the invention. The flow depicts multiple entities including a first entity computer 210, second entity computer 220, and third entity computer 410. In some implementations, the first entity computer 210 may be a first merchant computer, the second entity computer 220 may be a second entity computer, and the third entity computer 410 may be a third merchant computer.

At step S402, the token server computer 120 may generate a token in response to receiving a request from a token requestor. For example, the first entity computer may be the token requestor and request generation of a token from the token server computer 120. The token request may be issued in response to a user action, such as registering a payment card or stadium event ticket with a mobile application. In some embodiments, the generated token may be associated a PAN. The token server computer 120 may generate the token via the token generation module 342 (FIG. 3).

At step S404, after the token server computer 120 generates the token, the token server computer 120 may transmit the generated token to the first entity computer 210. The token may be transmitted over any suitable communication channel. One such example of a communication channel is the Internet. At step S406, after receiving the generated token from the token server computer 120, the first entity computer 210 may transmit the received token to the second entity computer 220. For example, the first entity computer 210 could be associated with a social networking site that supports payments to third-parties via the social networking site. The second entity computer 220 could be one such third-party that can process a payment for a good or service from the social networking site. As such, the token may be forwarded to the second entity computer 220 (e.g., third-party).

At step S408, after the second entity computer 220 receives the token from the first entity computer 210, the second entity computer 220 may generate a hashed value. In this example, the generated hashed value may be referred to as a "token usage key". The token usage key may be an output of a hashed function that processes one or more inputs associated with the token data and/or data associated with one of the entities. For example, the inputs to the hash function can be the token data itself and data identifying the second entity computer 220. The data identifying the second entity computer 220 could be any type of data that uniquely identifies the second entity computer 220. For example, the data identifying the second entity computer 220 could be a unique name (e.g., "Happy Stores, Inc. Location 3") or could be a identifier code (e.g., "3a8309fao3j2"), or even a public key in a public/private key pair. Further, the two (or more) inputs to the hash function can be concatenated with each other prior to performing the hash function on the concatenated value. For example, the token data and the data identifying the second entity computer 220 could be concatenated with each other prior to performing the hash function. If the token data is "4900000000000001" and the identifier code for the second entity computer is "3a8309fao3j2", the concatenated value would be "49000000000000013a8309fao3j2" Accordingly, the hash function could be performed on the value "49000000000000013a8309fao3j2". In some embodiments, the hash value may be a HMAC. Additionally, the second entity computer 220 may have a unique derivation key used to generate the HMAC value. In an example, if the unique derivation key is "asdf" and the HMAC uses a SHA1 message digest algorithm, the computed HMAC may be "167dc2ab5c962c3ffb38e601fa1199f73e0c8782". The computed HMAC may be referred to as the "token usage key". It can be appreciated that while this example mentions HMAC, any hashing algorithm may be used to compute the hash value.

At step S410, after the second entity computer 220 computes the hash value (e.g., computed HMAC), the computed hash value may be transmitted to the first entity computer 210 (e.g., the entity that forwarded the generated token to the second entity computer 220). In addition to the computed hash value, the data identifier associated with the second entity computer 220 may also be transmitted to the first entity computer 210. For example, the second entity computer 220 may transmit the computed hash value (e.g., "167dc2ab5c962c3ffb38e601fa1199f73e08782") and the data identifier associated with the second entity computer 220 (e.g., "3a8309fao3j2") to the first entity computer 210. Together, the computed hash value and the data identifier associated with the second entity computer 220 may be considered as a "receipt" indicating the second entity computer 220 successfully received the token from the first entity computer 210. In other words, the "receipt" may be considered as data indicative of the second entity computer 220 successfully receiving the token.

At step 3412, after receiving the computed hash value and data identifier associated with the second entity computer 220, the first entity computer 210 may forward the computed hash value and data identifier associated with the second entity computer 220 to the token server computer 120. By receiving these two data elements, the token server computer 120 may be able to track the token initially generated in step S402. Since the token server computer 120 has now received the computed hash value and the identity of the second entity computer 220, the token server computer 120 may have confidence that the token was passed on to the second entity computer 220 by a trusted entity (e.g., the first entity computer 210), since the token server computer 120 has a record of the distribution of the token.

At step S414, after receiving the computed hash value and data identifier associated with the second entity computer 220, the token server computer 120 may write the received computed hash value and data identifier associated with the second entity computer 220 into a registry. For example, the two data elements may be written in to the registry 350 (FIG. 3). Further, a link or association in the registry 350 (FIG. 3) may be made between the two received data elements. In some embodiments, instead of residing within the token server computer 120, the registry may reside external to the token server computer 120 (e.g., on a third-party computer or within a cloud network). In some implementations, step S414 may not be present and instead the first entity computer 210 may directly write the computed hash value and data identifier associated with the second entity computer 220 directly to a registry (e.g., a registry residing within a cloud network).

At step S416, the second entity computer 220 may transmit/forward the generated token to the third entity computer 410. The token may be transmitted over any communication channel. One such example of a communication channel is the Internet. For example, the third entity computer 410 could be yet another third-party that can process a payment for a good or service from the first third-party (e.g., the second entity computer 220). As such, the token may be forwarded to the third entity computer 410 (e.g., another third-party).

At step S418, after the third entity computer 410 receives the token from the second entity computer 220, the third entity computer 410 may generate a hashed value. In this example, the generated hashed value may be referred to as a "token usage key". The token usage key may be a hashed function of one or more inputs associated with the token data and/or data associated with one of the entities. For example, the inputs to the hash function can be the token data itself and data identifying the third entity computer 410. The data identifying the third entity computer 410 could be any type of data that uniquely identifies the third entity computer 410. For example, the data identifying the third entity computer 410 could be a unique name (e.g., "GoGo Events, Inc") or could be an identifier code (e.g., "59skei9274isl"). Further, the two inputs to the hash function can be concatenated with each other prior to performing the hash function on the concatenated value. For example, the token data and the data identifying the third entity computer 410 could be concatenated with each other prior to performing the hash function. If the token data is "490000000000001" (e.g., same token generated by the token server computer 120 in step S402) and the identifier code for the third entity computer 410 is "59skei9274isl", the concatenated value would be "49000000000000159skei9274isl". Accordingly, the hash function could be performed on the value "49000000000000159skei9274isl". In some embodiments, the hash function may be a HMAC. Additionally, the third entity computer 410 may have a unique derivation key used to generate the HMAC value. In an example, if the unique derivation key is "asdf" and the HMAC uses a SHA1 message digest algorithm, the computed HMAC may be "80d2847b9640d7aa1974364b7be29560f6991a36". The computed HMAC may be referred to as the "token usage key". It can be appreciated that while this example mentions HMAC, any hashing algorithm may be used to compute the hash value.

At step S420, after the third entity computer 410 computes the hash value (e.g., computed HMAC), the computed hash value may be transmitted to the second entity computer 220 (e.g., the entity that forwarded the generated token to the third entity computer 410). In addition to the computed hash value, the data identifier associated with the third entity computer 410 may also be transmitted to the second entity computer 220. For example, the third entity computer 410 may transmit the computed hash value (e.g, "80d2847b9640d7aa1974364b7be29560f6991a36") and the data identifier associated with the third entity computer 410 (e.g., "59skei9274isl") to the second entity computer 220. Together, the computed hash value and the data identifier associated with the third entity computer 410 may be considered as a "receipt" indicating that the third entity computer 410 successfully received the token from the second entity computer 220.

At step S422, after receiving the computed hash value and data identifier associated with the third entity computer 410, the second entity computer 220 may forward the computed hash value and data identifier associated with the third entity computer 410 to the token server computer 120. By receiving these two data elements, the token server computer 120 can track the token initially generated in step S402. Since the token server computer 120 has now received the computed hash value and the identity of the third entity computer 410, the token server computer 120 has confidence that the token was passed on to the third entity computer 410 by a trusted entity (e.g., the second entity computer 220), since the token server computer 120 has a record of the distribution of the token. More specifically, since the token server computer 120 received the first computed hash value (computed in step S408) and data identifier associated with the second entity computer 220, and has now received the second computed hash value (computed in step S418) and the data identifier associated with the third entity computer 410, the token server computer 120 can establish a "chain" of the distribution of the token from when it was originally generated by the token server computer 120 and transmitted to the first entity computer 210.

At step S424, after receiving the computed hash value and data identifier associated with the third entity computer 410, the token server computer 120 may write the received computed hash value and data identifier associated with the third entity computer 410 into the registry. For example, the two data elements may be written to the registry 350 (FIG. 3). Further, a link or association in the registry 350 (FIG. 3) may be made between the two received data elements. In some embodiments, instead of residing within the token server computer 120, the registry may reside external to the token server computer 120 (e g, on a third-party computer or within a cloud network). In some implementations, step S414 may not be present and instead the second entity computer 220 may directly write the computed hash value and data identifier associated with the third entity computer 410 directly to a registry (e.g., a registry residing within a cloud network).

Figure 5:
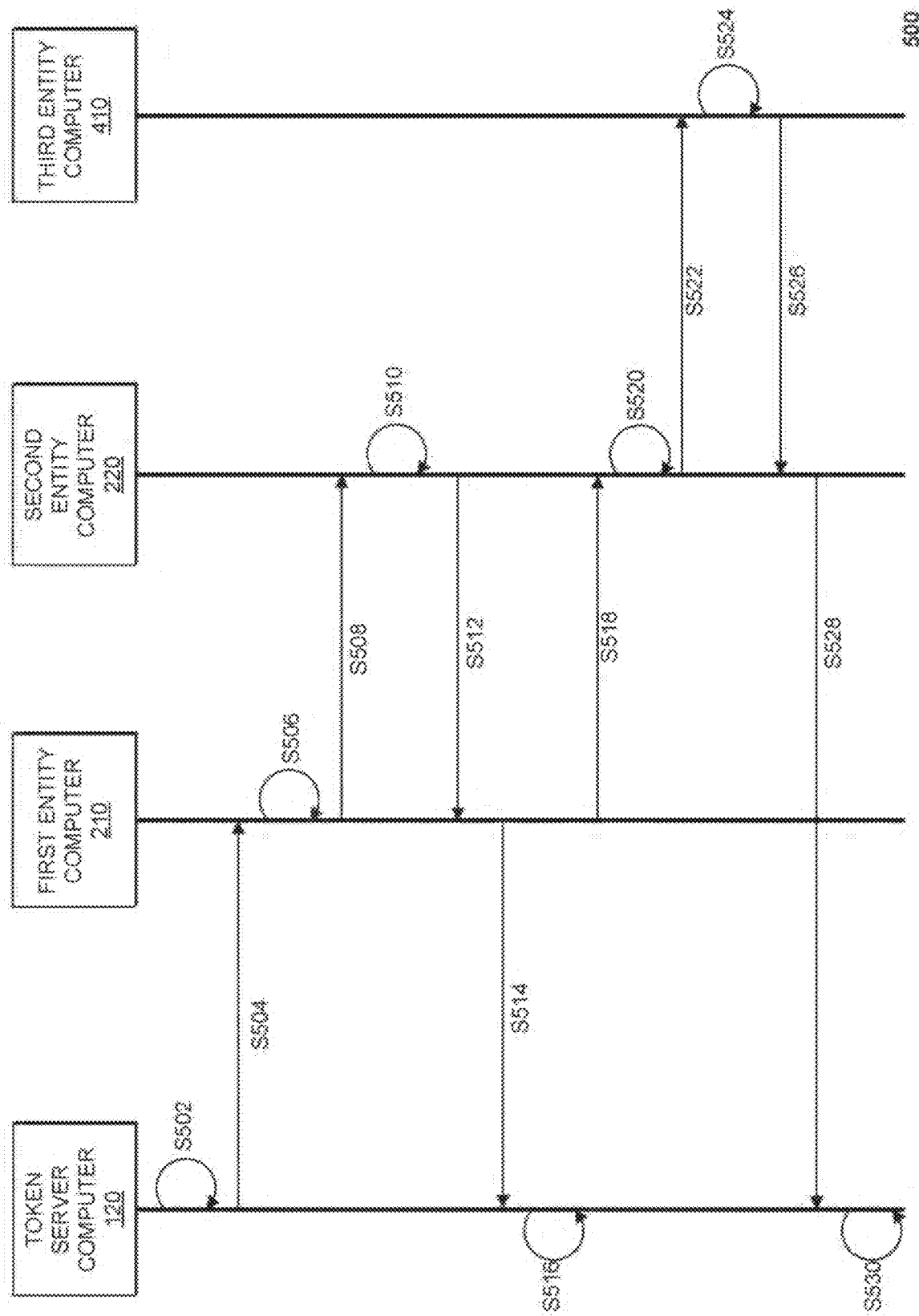
FIG. 5 illustrates another flow between a token server computer and multiple entities, in accordance with some embodiments of the invention.

FIG. 5 illustrates another flow 500 between a token server computer and multiple entities, in accordance with some embodiments of the invention. The flow 500 is similar to the flow in FIG. 4, except that the present flow 500 allows for data indicating an assurance that the token has been successfully distributed at each step. It also may allows the recipient of the token to acknowledge receipt with data that the sender can use to proof handoff of the token as well. The flow 500 depicts multiple entities including a first entity computer 210, second entity computer 220, and third entity computer 410. In some implementations, the first entity computer 210 may be a first merchant computer, the second entity computer 220 may be a second entity computer, and the third entity computer 410 may be a third merchant computer.

At step S502, the token server computer 120 may generate a token in response to receiving a request from a token requestor. For example, the first entity computer 210 may be the token requestor and request generation of a token from the token server computer 120. The token request may be issued in response to a user action, such as registering a payment card or stadium event ticket with a mobile application. In some embodiments, the generated token may be associated a PAN. The token server computer 120 may generate the token via the token generation module 342 (FIG. 3).

At step S504, after the token server computer 120 generates the token, the token server computer 120 may transmit the generated token to the first entity computer 210. The token may be transmitted over any communication channel. One such example of a communication channel is the Internet.

At step S506, after receiving the generated token from the token server computer 120, the first entity computer 210 may generate a hash value. In this example, the generated hash value may be referred to as "Digest Entity 1 (DE1)". DE1 may represent a sort of additional "token digest" signifying that the first entity computer 210 successfully received the token from the token server computer 120. DE1 may be a hashed function of one or more inputs associated with the token data and/or data associated with one of the entities. For example, the inputs to the hash function for DE1 can be the token data itself and data identifying the destination entity that the first entity computer 210 intends to forward the token on to (e.g., the second entity computer 220). The data identifying the second entity computer 220 could be any type of data that uniquely identifies the second entity computer 220. For example, the data identifying the second entity computer 220 could be a unique name (e.g., "Happy Stores, Inc. Location 3") or could be a identifier code (e.g. "3a8309fao3j2"). Further, the two inputs to the hash function can be concatenated with each other prior to performing the hash function on the concatenated value. For example, the token data and the data identifying the second entity computer 220 could be concatenated with each other prior to performing the hash function. If the token data is "4900000000000001" and the identifier code for the second entity computer is "3a8309fao3j2", the concatenated value would be "4900000000000013a8309fao3j2". Accordingly, the hash function could be performed on the value "4900000000000013a8309fao3j2". In some embodiments, the hash function may be a HMAC. In some embodiments, the first entity computer 210 may have knowledge of the data identifying the second entity computer 220. Additionally, the first entity computer 210 may have a unique derivation key used to generate the HMAC value. In an example, if the unique derivation key is "asdf" and the HMAC uses a SHA1 message digest algorithm, the computed HMAC for DE1 may be "167dc2ab5c962c3ffb38e601fa1199f73e0c8782" The computed HMAC may be referred to as the "DE1" It can be appreciated that while this example mentions HMAC, any hashing algorithm may be used to compute the hash value.

At step S508, the first entity computer 210 may forward the token and DE1 to the second entity computer 220. The token and DE1 may be transmitted over any communication channel. One such example of a communication channel is the Internet. For example, the first entity computer 210 could be associated with a social networking site that supports payments to third-parties via the social networking site. The second entity computer 220 could be one such third-party that can process a payment for a good or service from the social networking site. As such, the token and DE1 may be forwarded to the second entity computer 220 (e.g., third-party).

At step S510, after receiving the token and DE1 from the first entity computer 210, the second entity computer 220 may generate a hash value. In this example, the generated hashed value may be referred to as a first "token usage key". The token usage key may be a hashed function of one or more inputs associated with the DE1 and/or data identifying the second entity computer 220. For example, the inputs to the hash function can be the data identifying the second entity computer 220 and DE1 generated by the first entity computer 210 in step S506. Further, the two inputs to the hash function can be concatenated with each other prior to performing the hash function on the concatenated value. For example, the DE1 and the data identifying the second entity computer 220 could be concatenated with each other prior to performing the hash function. If DE1 is "167dc2ab5c962c3ffb38e601fa1199f73e0c8782" and the data identifying the second entity computer is "3a8309fao3j2", the concatenated value would be "167dc2ab5c962c3ffb38e601fa1199f73e0c87823a8309 fao3j2". Accordingly, the hash function could be performed on the value "167dc2ab5c962c3ffb38e601fa1199f73e0c87823a8309 fao3j2" in some embodiments, the hash function may be a HMAC. Additionally, the second entity computer 220 may have a unique derivation key used to generate the HMAC value. In an example, if the unique derivation key is "asdf" and the HMAC uses a SHA1 message digest algorithm, the computed HMAC may be "97c9d00d5f1d97464383fff441d0c4e34651b5ae" The computed HMAC may be referred to as the first "token usage key". It can be appreciated that while this example mentions HMAC, any hashing algorithm may be used to compute the hash value. At step S512, after the second entity computer 220 computes the hash value (e.g., computed HMAC), the computed hash value may be transmitted to the first entity computer 210 (e.g., the entity that forwarded the generated token to the second entity computer 220). In addition to the computed hash value, the data identifier associated with the second entity computer 220 may also be transmitted to the first entity computer 210. For example, the second entity computer 220 may transmit the computed hash value (e.g., "97c9d00d5f1d97464383fff441d0c4e34551b5ae") and the data identifier associated with the second entity computer 220 (e.g., "3a8309fao3j2") to the first entity computer 210.

Together, the computed hash value and the data identifier associated with the second entity computer 220 may be considered as a "token usage key" or "receipt" indicating the second entity computer 220 successfully received the token from the first entity computer 210.

At step S514, after receiving the computed hash value (e.g., the token usage key) and data identifier associated with the second entity computer 220, the first entity computer 210 may forward the computed hash value and data identifier associated with the second entity computer 220 to the token server computer 120. By receiving these two data elements, the token server computer 120 may be able to track the token initially generated in step S502. Since the token server computer 120 has now received the computed hash value and the identity of the second entity computer 220, the token server computer 120 may have confidence that the token was passed on to the second entity computer 220 by a trusted entity (e.g, the first entity computer 210), since the token server computer 120 has a record of the distribution of the token. Additionally, since one of the elements of the token usage key is DE1, which was generated by the first entity computer 210 upon successfully receiving the token from the token server computer 120, the token server computer 120 may also have record that the first entity computer 210 received the token and forwarded it to the second entity computer 220.

At step S516, after receiving the computed hash value (e.g., token usage key) and data identifier associated with the second entity computer 220, the token server computer 120 may write the received computed hash value and data identifier associated with the second entity computer 220 into a registry. For example, the two data elements may be written in to the registry 350 (FIG. 3). Further, a link or association in the registry 350 (FIG. 3) may be made between the two received data elements, in some embodiments, instead of residing within the token server computer 120, the registry may reside external to the token server computer 120 (e.g., on a third-party computer or within a cloud network). In some implementations, step $516 may not be present and instead the first entity computer 210 may directly write the computed hash value and data identifier associated with the second entity computer 220 directly to a registry (e.g., a registry residing within a cloud network).

At step S518, the second entity computer 220 may transmit/forward the generated token to the third entity computer 410. The token may be transmitted over any communication channel. One such example of a communication channel is the Internet. For example, the third entity computer 410 could be yet another third-party that can process a payment for a good or service from the first third-party (e.g. the second entity computer 220). As such, the token may be forwarded to the third entity computer 410 (e.g., another third-party).

At step S520, after the third entity computer 410 receives the token from the second entity computer 220, the third entity computer 410 may generate a hashed value. In this example, the generated hash value may be referred to as "Digest Entity 2 (DE2)". DE2 may represent a sort of additional "token digest" signifying that the first entity computer 210 successfully received the token from the token server computer 120. DE2 may be an output of a hashed function of one or more inputs associated with the first token usage key generated in step S510 and/or data associated with one of the entities. For example, the inputs to the hash function resulting in DE2 can be the first token usage key and data identifying the destination entity that the second entity computer 220 intends to forward the token on to (e.g., the third entity computer 410). The data identifying the third entity computer 410 could be any type of data that uniquely identifies the third entity computer 410. For example, the data identifying the third entity computer 410 could be a unique name (e.g., "GoGo Events, Inc.") or could be a identifier code (e.g., "59skei9274isl"). Further, the two inputs to the hash function can be concatenated with each other prior to performing the hash function on the concatenated value. For example, the first token usage key and the data identifying the third entity computer 410 could be concatenated with each other prior to performing the hash function. Since, the first token usage key generated in step S510 is "cba076904769c3d9b0435ae53dd41759fafd606f" and the identifier code for the second entity computer is "59skei9274isl", the concatenated value would be "cba076904769c3d9b0435ae53dd41759fafd606f59 skei9274isl". Accordingly, the hash function could be performed on the value "cba076904769c3d9b0435ae53dd41759fafd606f59 skei9274isl". In some embodiments, the hash function may be a HMAC in some embodiments, the second entity computer 220 may have knowledge of the data identifying the third entity computer 410. Additionally, the second entity computer 220 may have a unique derivation key used to generate the HMAC value. In an example, if the unique derivation key is "asdf" and the HMAC uses a SHA1 message digest algorithm, the computed HMAC for DE2 may be "e8cbcb3f0419b5f2b481c6de0662d7c51da03c80". The computed HMAC (e.g., DE2) may be referred to as the second "token usage key" It can be appreciated that while this example mentions HMAC, any hashing algorithm may be used to compute the hash value.

At step S522, the second entity computer 220 may forward the token and DE2 to the third entity computer 410. The token and DE2 may be transmitted over any communication channel. One such example of a communication channel is the Internet. For example, the second entity computer 220 could be associated with a social networking site that supports payments to third-parties via the social networking site. The third entity computer 410 could be one such third-party that can process a payment for a good or service from the social networking site. As such, the token and DE2 may be forwarded to the third entity computer 410.

At step S524, after receiving the token and DE2 from the second entity computer 220, the third entity computer 410 may generate a hash value. In this example, the generated hashed value may be referred to as a second "token usage key". The second token usage key may be a hashed function of one or more inputs associated with the DE2 and data identifying the third entity computer 410. For example, the inputs to the hash function can be the DE2 generated by the second entity computer 220 in step S520 and data identifying the third entity computer 410 (e.g, "59skei9274isl". Further, the two inputs to the hash function can be concatenated with each other prior to performing the hash function on the concatenated value. For example. DE2 and the data identifying the third entity computer 410 could be concatenated with each other prior to performing the hash function. Since DE2 is "e8cbcb3f0419b5f2b481c6de0662d7c51da03c80" and the data identifying the third entity computer is "59skei9274isl", the concatenated value would be "e8cbcb3f0419b5f2b481c6de0662d7c51da03c8059 skei9274isl". Accordingly, the hash function could be performed on the value "e8cbcb3f0419b5f2b481c6de0662d7c51da03c8059 skei9274isl". In some embodiments, the hash function may be a HMAC function. Additionally, the third entity computer 410 may have a unique derivation key used to generate the HMAC value In an example, if the unique derivation key is "asdf" and the HMAC uses a SHA1 message digest algorithm, the computed HMAC may be "f146ede2cf1e0685a0042e4c9301c635e15b3a6e" The computed HMAC may be referred to as the second "token usage key". It can be appreciated that while this example mentions HMAC, any hashing algorithm may be used to compute the hash value.

At step S526, after the third entity computer 410 computes the hash value (e.g, computed HMAC), the computed hash value may be transmitted to the second entity computer 220 (e.g., the entity that forwarded the generated token to the third entity computer 410). In addition to the computed hash value, the data identifier associated with the third entity computer 410 may also be transmitted to the first entity computer 210. For example, the third entity computer 410 may transmit the computed hash value (e.g., "f146ede2cf1e0685a0042e4c9301c635e15b3a6e") and the data identifier associated with the third entity computer 410 (e.g., "59skei9274isl") to the second entity computer 220. Together, the computed hash value and the data identifier associated with the third entity computer 410 may be considered as a second "token usage key" or "receipt" indicating the third entity computer 410 successfully received the token from the first entity computer 210.

At step S528, after receiving the computed hash value (e.g., the second token usage key) and data identifier associated with the third entity computer 410, the second entity computer 220 may forward the computed hash value and data identifier associated with the third entity computer 410 to the token server computer 120. By receiving these two data elements, the token server computer 120 can track the token initially generated in step S502. Since the token server computer 120 has now received the computed hash value (e.g., second token usage key) and the identity of the third entity computer 410, the token server computer 120 can have confidence that the token was passed on to the third entity computer 410 by a trusted entity (e.g., the second entity computer 220), since the token server computer 120 has a record of the distribution of the token. Additionally, since one of the elements of the token usage key is DE2, which was generated by the second entity computer 220 upon successfully receiving the token from the token server computer 120, the token server computer 120 may also have a record that the second entity computer 220 received the token (from the first entity computer 210) and forwarded it to the third entity computer 410. This is because the hash value of second token usage key is made up of components including DE2, which is made up of components including the first token usage key, which is made up of components including the DE1, which is made up of components including the token data. Accordingly, the hash value can trace the entire chain of distribution of the token from initial generation of the token in step S502.

At step S530, after receiving the computed hash value (e.g., second token usage key) and data identifier associated with the third entity computer 410, the token server computer 120 may write the received computed hash value and data identifier associated with the third entity computer 410 into a registry. For example, the two data elements may be written in to the registry 350 (FIG. 3). Further, a link or association in the registry 350 (FIG. 3) may be made between the two received data elements. In some embodiments, instead of residing within the token server computer 120, the registry may reside external to the token server computer 120 (e.g., on a third-party computer or within a cloud network). In some implementations, step S530 may not be present and instead the second entity computer 220 may directly write the computed hash value (e.g., second token usage key) and data identifier associated with the third entity computer 410 directly to a registry (e.g., a registry residing within a cloud network).

Figure 6:
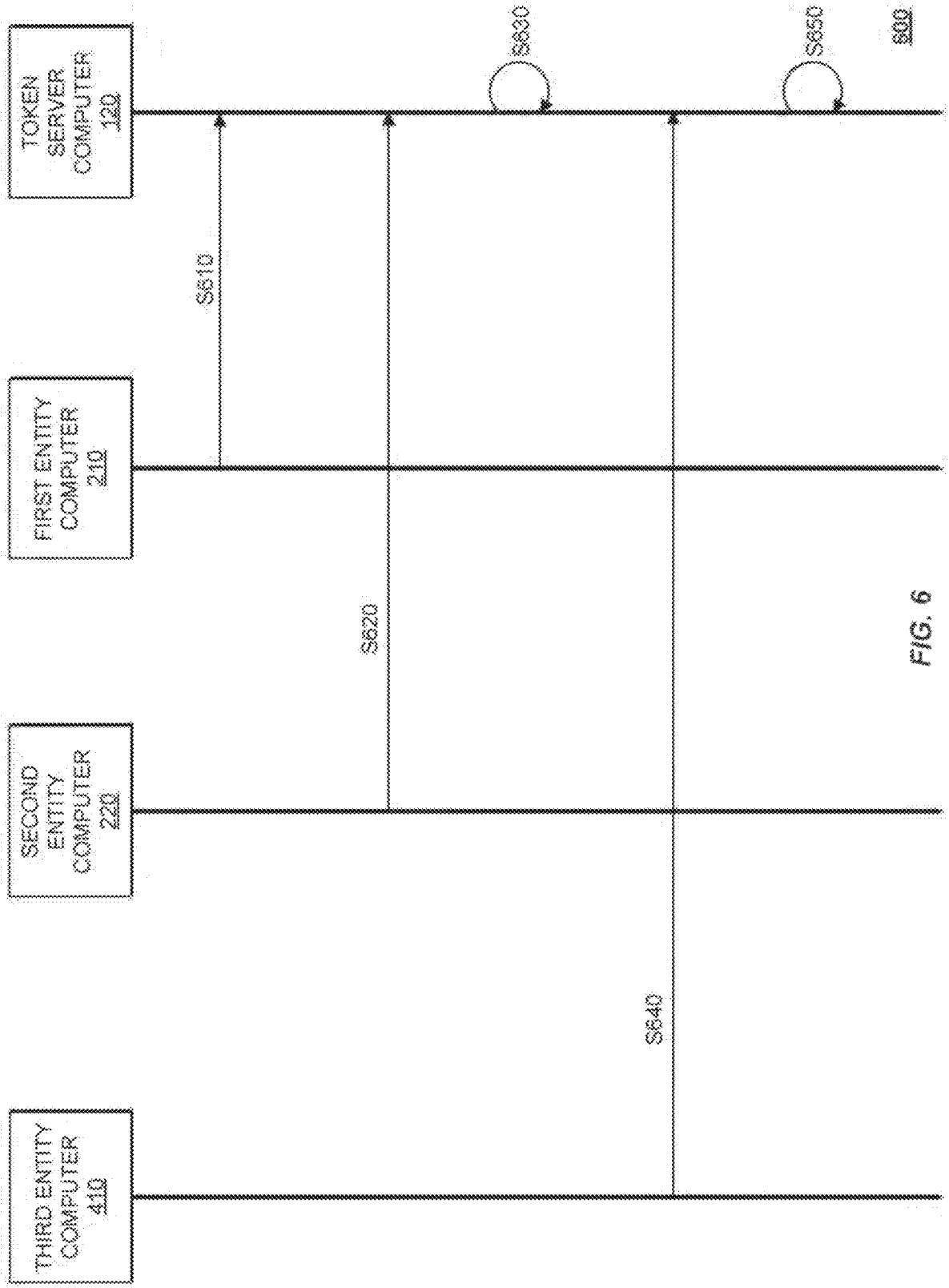
FIG. 6 illustrates a flow of validating a token, in accordance with embodiments of the invention.

FIG. 6 illustrates a flow of validating a token, in accordance with embodiments of the invention. While the examples in FIG. 4 and FIG. 5 may illustrate the initial setup the first time a token is distributed to various entities, the following figure illustrates the process of validating or authorizing the use of a token after the initial setup.

At step S610, the first entity computer 210 may transmit token data to the token server computer 120. The token may be transmitted to the token server computer 120 at, for example, the time of a transaction using the token. Upon receiving the token data, the token server computer 120 may validate the token and approve/deny the transaction based on the validation. This step may be performed in accordance with traditional token processing techniques.

At step S620, the second entity computer 220 may transmit the token and the first token usage key to the token server computer 120. The token and the first token usage key may be transmitted to the token server computer 120 at, for example, the time of a transaction being performed by the second entity computer 220 using a token that was forwarded to it by the first entity computer 210. At step S630, the token server computer 120 may validate the token by comparing the received first token usage key to the first token usage key stored within the registry. If the received first token usage key matches the first token usage key stored within the registry, the token server computer 120 may validate and approve the use of the token in the transaction. Otherwise, the token server computer 120 may deny the use of the token in the transaction.

Similarly, at step S640, the third entity computer 410 may transmit the token and the second token usage key to the token server computer 120. The token and the second token usage key may be transmitted to the token server computer 120 at, for example, the time of a transaction being performed by the third entity computer 410 using a token that was forwarded to it by the second entity computer 220. At step S650, the token server computer 120 may validate the token by comparing the received second token usage key to the second token usage key stored within the registry. If the received second token usage key matches the second token usage key stored within the registry, the token server computer 120 may validate and approve the use of the token in the transaction. Otherwise, the token server computer 120 may deny the use of the token in the transaction.

Figure 7:
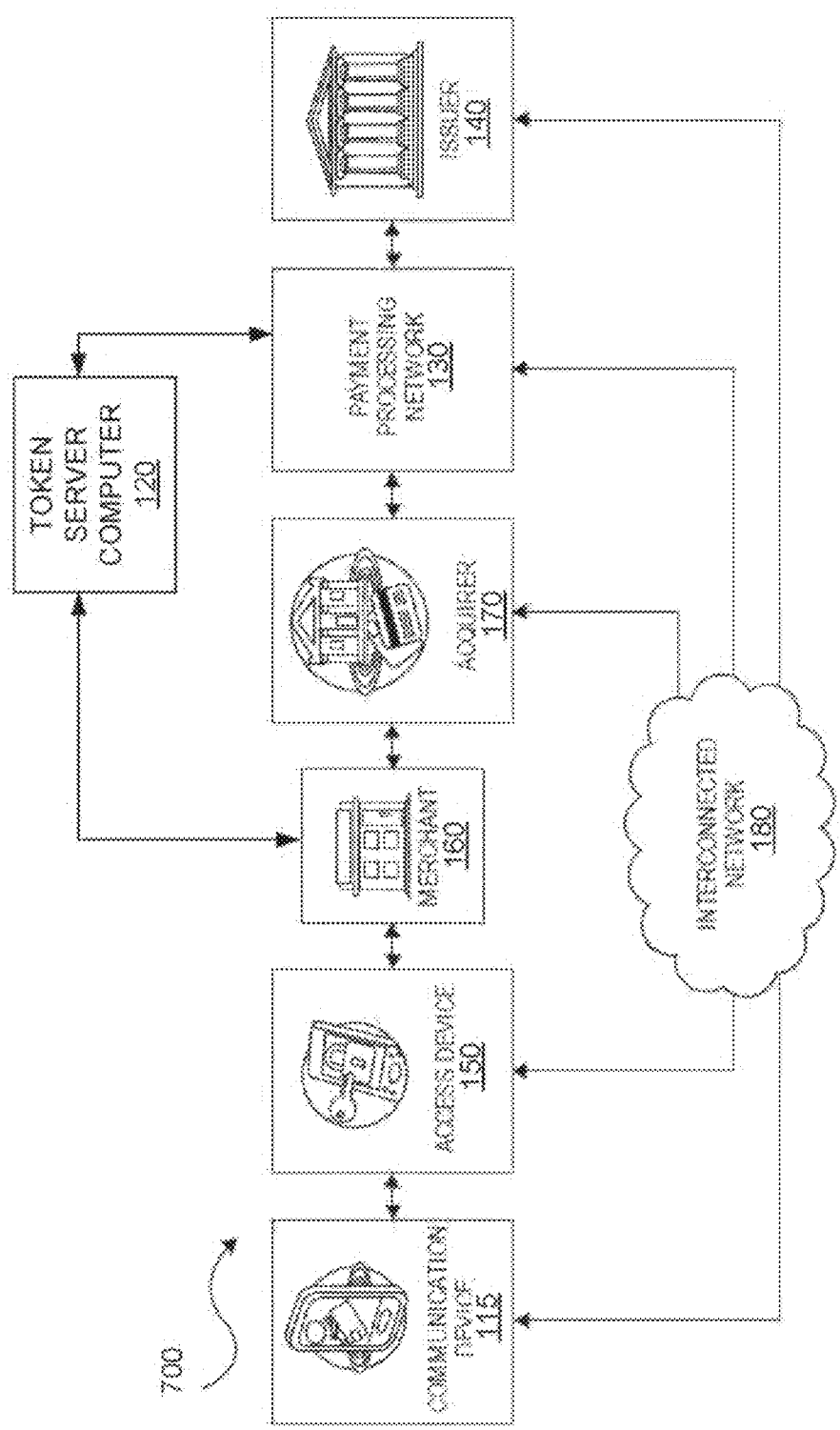
FIG. 7 shows a block diagram of an exemplary payment system, according to some embodiments of the invention.

FIG. 7 shows a block diagram of a more detailed view of a transaction processing system 700. The system 700 may include a communication device 115, a token server computer 120, an access device 150, a merchant computer 160, an acquirer computer 170, a payment processing network computer 130, and an issuer computer 140. In some implementations, different entities in FIG. 7 may communicate with each other using one or more interconnected communication networks 180 such as the Internet, a cellular network, a TCP/IP network or any other suitable communication network. Note that one or more entities in the system 700 may be associated with a computer apparatus that may be implemented using some of the components as described with reference to the previous figures.

The communication device 115 may be associated with a payment account of a user. In some implementations, the communication device 115 may be a mobile device such as a mobile phone, a tablet, a PDA, a notebook, a key fob or any suitable mobile device. In some embodiments, the communication device 115 may be a wearable device such as, but not limited to, a smart watch, a fitness band, an ankle bracelet, a ring, earrings, etc. For example, the communication device 115 may include a virtual wallet or a payment application that may be associated with one or more payment accounts of the user. In some implementations, the communication device 115 may be capable of communicating with the access device 150 using a wireless data protocol such as Wi-Fi™ or Bluetooth™. For example, the communication device 115 may interact with the access device 150 by establishing a connection with the access device 150 using a wireless data protocol. In some embodiments, the communication device 115 may be the token requestor 110 (FIG. 1).

The access device 150 may be an access point to a transaction processing system that may comprise the acquirer computer 170, the payment processing network computer 130, and the issuer computer 140. In some implementations, the access device 150 may be associated with or operated by the merchant computer 160. For example, the access device 150 may be a point of sale device that may include a contactless reader, an electronic cash register, a display device, etc In some implementations, the access device 150 may be configured to transmit information pertaining to one or more purchased items at a merchant 160 to an acquirer 170 or payment processing network 130. In some implementations, the access device 150 may be a personal computer that may be used by the user to initiate a transaction with the merchant computer 160 (e.g., an online transaction).

The acquirer computer 170 may be operated by an acquirer. The acquirer computer 170 is typically a system for an entity (e.g., a bank) that has a business relationship with a particular merchant, a wallet provider or another entity. The acquirer computer 170 may be communicatively coupled to the merchant computer 160 and the payment processing network 130 and may issue and manage a financial account for the merchant. The acquirer computer 630 may be configured to route the authorization request for a transaction to the issuer computer 140 via the payment processing network computer 130 and route an authorization response received via the payment processing network computer 130 to the merchant computer 160.

The payment processing network computer 130 may be configured to provide authorization services, and clearing and settlement services for payment transactions. The payment processing network computer 130 may include data processing subsystems, wired or wireless networks, including the internet. An example of the payment processing network computer 130 includes VisaNet™, operated by Visa™. Payment processing networks such as VisaNet™ are able to process credit card transactions, debit card transactions, and other types of commercial transactions, VisaNet™, in particular includes a Visa Integrated Payments (VIP) system which processes authorization requests and a Base II system which performs clearing and settlement services. The payment processing network computer 130 may include a server computer In some implementations, the payment processing network computer 130 may forward an authorization request received from the acquirer computer 170 to the issuer computer 140 via a communication channel. The payment processing network computer 130 may further forward an authorization response message received from the issuer computer 140 to the acquirer computer 170.

The issuer computer 140 may represent an account issuer and/or an issuer processor. Typically, the issuer computer 140 may be associated with a business entity (e.g., a bank) that may have issued an account and/or payment card (e.g., credit account, debit account, etc.) for payment transactions. In some implementations, the business entity (bank) associated with the issuer computer 140 may also function as an acquirer (e.g., the acquirer computer 630).

The token server computer 120 is responsible for generation and registration of a token. For example: the communication device 115 may request (e.g. via a digital wallet application associated with an entity computer) a token from the token server computer 120 and upon verification, the token server computer 120 generates, registers, and returns the token to the communication device 115. The communication device 115 then initiates a payment transaction with the payment processing network 130 by sending an authorization request message including the token to the payment processing network 130. The payment processing network 130 then forwards the authorization request message to the issuer computer 140 for authorization.

The various participants and elements described herein with reference to FIGS. 1-6 may operate one or more computer apparatuses to facilitate the functions described herein. Any of the elements in FIGS. 1-6, including any servers or databases may use any suitable number of subsystems to facilitate the functions described herein.

Figure 8:
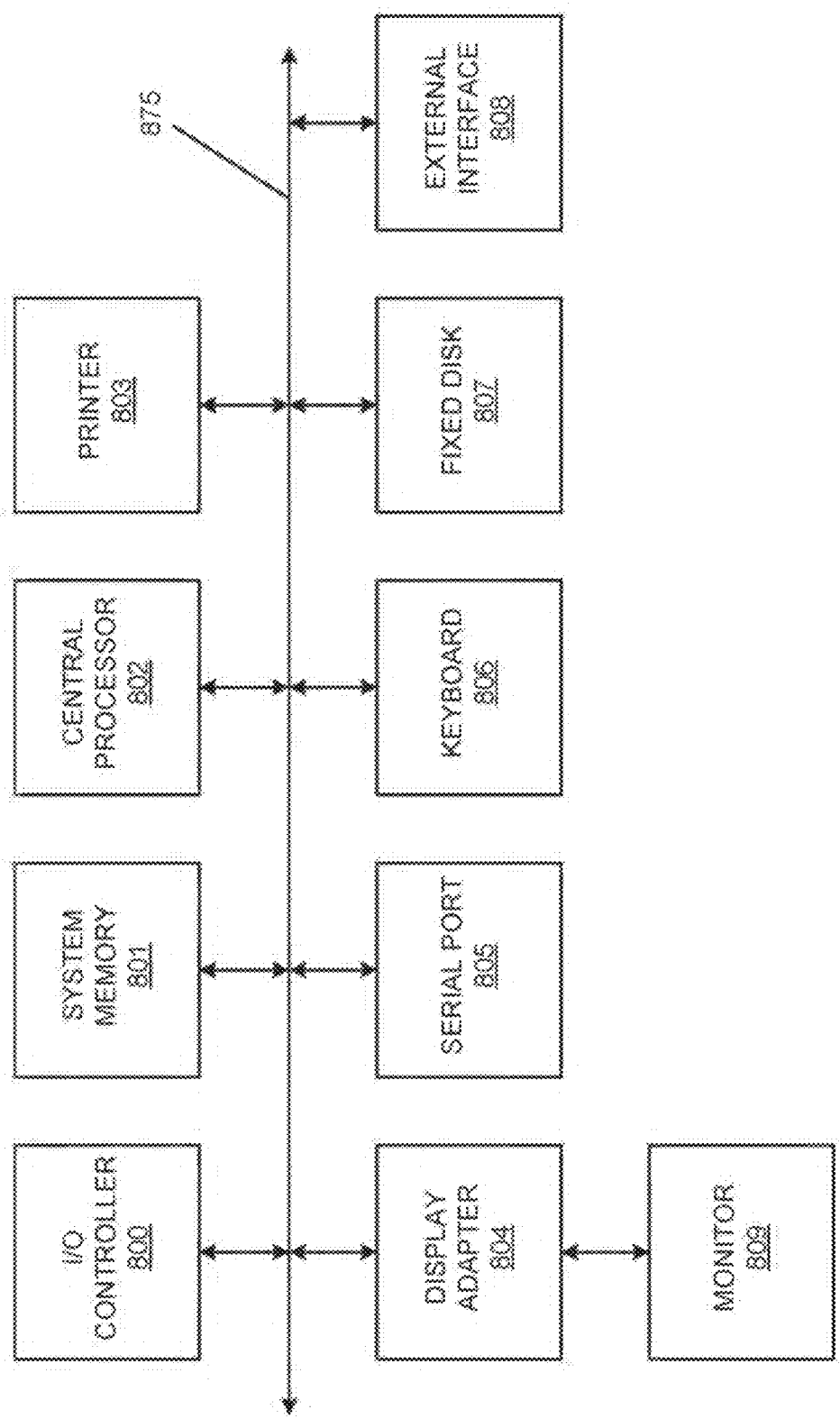
FIG. 8 shows exemplary computer apparatus, in accordance with some embodiments of the invention.

Examples of such subsystems or components are shown in FIG. 8. The subsystems shown in FIG. 8 are interconnected via a system bus 876. Additional subsystems such as a printer 803, keyboard 806, fixed disk 807 (or other memory comprising computer readable media), monitor 809, which is coupled to display adapter 804, and others are shown. Peripherals and input/output (I/O) devices, which couple to I/O controller 800 (which can be a processor or other suitable controller), can be connected to the computer system by any number of means known in the art, such as serial port 805. For example, serial port 805 or external interface 808 can be used to connect the computer apparatus to a wide area network such as the Internet, a mouse input device, or a scanner. The interconnection via system bus allows the central processor 802 to communicate with each subsystem and to control the execution of instructions from system memory 801 or the fixed disk 807, as well as the exchange of information between subsystems. The system memory 801 and/or the fixed disk 807 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. The process flow may be extended beyond the number of components shown. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for facilitating a transaction, comprising:
   receiving, by a second entity computer from a first entity computer in communication with a token server computer, a token from the token server computer, wherein the first entity computer is a first merchant computer and the second entity computer is a second merchant computer, and wherein the token server computer generated the token for use by the first entity computer responsive to a request from the first entity computer;
   generating, by the second entity computer, a first hash value, the first hash value being a hash of at least the token and data indicative of an identity of the second entity computer, concatenated together before generating the first hash value, wherein the data indicative of the identity of the second entity computer is data that uniquely identifies the second entity computer;
   transmitting, by the second entity computer, the first hash value and the data indicative of the identity of the second entity computer to the first entity computer, which transmits the first hash value and the data indicative of the identity of the second entity computer to the token server computer, the token server computer thereafter writing the first hash value and the data indicative of the identity of the second entity computer to a token registry on a cloud network external to the token server computer;
   transmitting by the second entity computer, the token to a third entity computer, wherein the third entity computer generates a second hash value, the second hash value being a hash of at least the token and data indicative of an identity of the third entity computer, concatenated together before generating the second hash value, wherein the data indicative of the identity of the third entity computer is data that uniquely identifies the third entity computer;
   receiving, by the second entity computer from the third entity computer, the second hash value and the data indicative of the identity of the third entity computer; and
   transmitting, by the second entity computer, the second hash value to the token server computer, the token server computer thereafter:
   validating the token based on the first hash value and the second hash value,
   writing the second hash value and the data indicative of the identity of the third entity computer to the token registry, and
   wherein the token is used to conduct a transaction based on the validation.

2. The method of claim 1, wherein the token is associated with a ticket to an event.

3. The method of claim 1, wherein the token is associated with a primary account number (PAN).

4. The method of claim 1, wherein the data indicative of the identity of the second entity computer is in the form of a code.

5. The method of claim 1, wherein the token is a payment token.

6. A second entity computer comprising:
   a processor; and
   a non-transitory computer readable medium, the non-transitory computer readable medium comprising code executable by the processor to cause the processor to:
   receive, from a first entity computer in communication with a token server computer, a token from the token server computer, wherein the first entity computer is a first merchant computer and the second entity computer is a second merchant computer, and wherein the token server computer generated the token for use by the first entity computer responsive to a request from the first entity computer;
   generate a first hash value, the first hash value being a hash of at least the token and data indicative of an identity of the second entity computer, concatenated together before generating the first hash value, wherein the data indicative of the identity of the second entity computer is data that uniquely identifies the second entity computer;
   transmit the first hash value and the data indicative of the identity of the second entity computer to the first entity computer, which transmits the first hash value and the data indicative of the identity of the second entity computer to the token server computer, the token server computer thereafter writing the first hash value and the data indicative of the identity of the second entity computer to a token registry on a cloud network external to the token server computer;
   transmit the token to a third entity computer, wherein the third entity computer generates a second hash value, the second hash value being a hash of at least the token and data indicative of an identity of the third entity computer, concatenated together before generating the second hash value, wherein the data indicative of the identity of the third entity computer is data that uniquely identifies the third entity computer;
   receive, from the third entity computer, the second hash value and the data indicative of the identity of the third entity computer; and
   transmit the second hash value to the token server computer, token server computer thereafter:
   validating the token based on the first hash value and the second hash value,
   writing the second hash value and the data indicative of the identity of the third entity computer to the token registry, and
   wherein the token is used to conduct a transaction based on the validation.

7. The second entity computer of claim 6, wherein the token is a payment token.

8. The second entity computer of claim 6, wherein the token is a ticket to an event.

9. The second entity computer of claim 6, wherein the token is a substitute for a primary account number (PAN).

10. The second entity computer of claim 6, wherein the data indicative of the second entity computer is in the form of a code.

11. A method comprising:

transmitting, by a first entity computer in communication with a token server computer, a request for a token, thereby causing the token server computer to generate the token for use by the first entity computer;

responsive to the request, receiving, by the first entity computer, the token from the token server computer, wherein the first entity computer is a first merchant computer;

transmitting, by the first entity computer, the token to a second entity computer that is a second merchant computer, thereby causing the second entity computer to:

receive, from the first entity computer via the token server computer, the token, generate a first hash value, the first hash value being a hash of at least the token and data indicative of an identity of the second entity computer, concatenated together before generating the first hash value, wherein the data indicative of the identity of the second entity computer is data that uniquely identifies the second entity computer, transmit the first hash value and the data indicative of the identity of the second entity computer to the first entity computer;

transmit the token to a third entity computer, wherein the third entity computer generates a second hash value, the second hash value being a hash of at least the token and data indicative of an identity of the third entity computer, concatenated together before generating the second hash value, wherein the data indicative of the identity of the third entity computer is data that uniquely identifies the third entity computer, receive, by the second entity computer from the third entity computer, the second hash value and the data indicative of the identity of the third entity computer, and transmit the second hash value to the token server computer, receiving, by the first entity computer, the first hash value; and transmitting, by the first entity computer, the first hash value to the token server computer, which writes the first hash value and the second hash value to a registry on a cloud network external to the token server computer, wherein the token server computer thereafter validates the token based on the first hash value and the second hash value, and wherein the token is used to conduct a transaction based on the validation.

* * * * *